Figure 1:
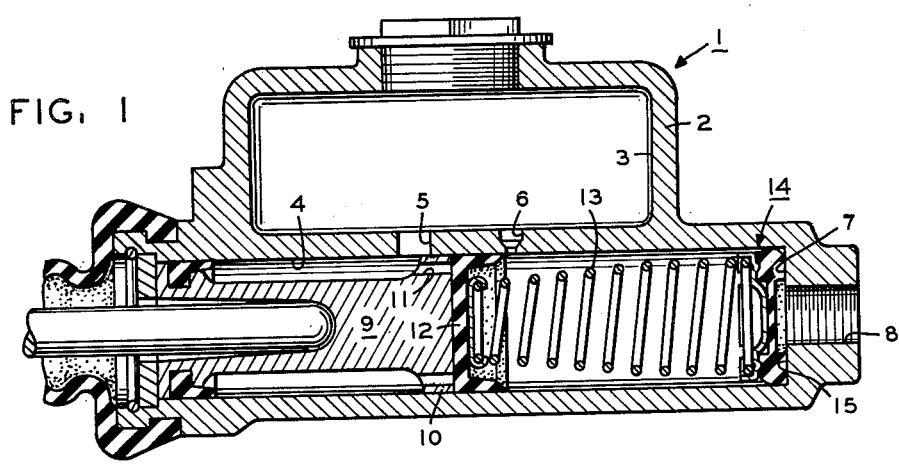

April 7, 1964     F. W. BALSTER     3,127,906
CHECK VALVE ASSEMBLY

Filed Aug. 20, 1962     2 Sheets-Sheet 1

INVENTOR
FREDERICK W. BALSTER
BY *Joseph E. Papin*

April 7, 1964   F. W. BALSTER   3,127,906
CHECK VALVE ASSEMBLY
Filed Aug. 20, 1962   2 Sheets-Sheet 2

INVENTOR
FREDERICK W. BALSTER
BY

United States Patent Office 3,127,906
Patented Apr. 7, 1964

3,127,906
CHECK VALVE ASSEMBLY
Frederick W. Balster, Cedar Rapids, Iowa, assignor to Wagner Electric Corporation, St. Louis, Mo., a corporation of Delaware
Filed Aug. 20, 1962, Ser. No. 217,842
6 Claims. (Cl. 137—493)

This invention relates generally to fluid controlled devices for braking systems and in particular to a novel check valve assembly for a master cylinder.

In past check valve assemblies controlling displacement and return flow of pressure fluid between a master cylinder and a brake system, a valve member having pressure fluid egress ports therethrough was biased into sealing engagement with an annular sealing member to normally position said sealing member in sealing engagement with a valve seat circumscribing the master cylinder outlet to the brake systems, and an annular flap was integrally provided on said sealing member in overlapping sealing engagement with said valve member to permit displacement flow of pressure fluid through the valve member egress ports and prevent return flow of pressure fluid therethrough. Since the passage for the return flow through the valve member egress ports was closed by the flap, the fluid pressure of said return flow caused the annular sealing member to disengage the master cylinder outlet valve seat against the biasing force of said valve member to establish an alternate passage for the return flow of pressure fluid from the brake system to the master cylinder. One of the undesirable features of such past check valve assemblies was the movement or "floating action" of the sealing member upon disengagement from the master cylinder outlet valve seat by the return flow of pressure fluid since said sealing member could re-engage said valve seat in a deformed or crimped position. Another undesirable feature was that the movable or floating sealing element was displacable into the master cylinder outlet port to prevent displacement flow when the master cylinder was supercharged. Supercharging is a term commonly used in the industry and art to denote a condition wherein more pressure fluid is displaced into the brake system than said brake system would normally hold under static or inoperative conditions to overcome abnormal pedal stroke requirements effected by wear on the brake system component parts or the like.

An object of the present invention is to provide a check valve assembly for controlling the displacement and return flow of pressure fluid through a master cylinder outlet in a positive efficient manner without being subject to the undesirable features of the prior art devices.

Another object of the present invention is to provide an improved sealing member for a master cylinder outlet check valve assembly.

Another object of the present invention is to provide a check valve assembly for a master cylinder outlet having a substantially stationary sealing element.

Another object of the present invention is to provide a check valve assembly for a master cylinder outlet in which the sealing member substantially remains in sealing engagement with the master cylinder outlet valve seat during the return flow of pressure fluid back to the master cylinder.

Another object of the present invention is to provide a check valve assembly for a master cylinder outlet having a unitary sealing member which permits displacement and return flow of pressure fluid therethrough between the master cylinder and an associated brake system.

Still another object of the present invention is to provide a check valve assembly for a master cylinder outlet having a separable valve member and sealing member.

And still another object of the instant invention is to provide a check valve assembly for a master cylinder outlet having a minimum number of parts which are economically and easily assembled.

A further object of the present invention is to provide a check valve assembly for a master cylinder outlet having a substantially stationary annular sealing element positioned in circumscribing sealing relation with said master cylinder outlet and having an integrally formed diaphragm means for controling the flow of pressure fluid through a port formed in a valve member normally biased into sealable engagement with said sealing element.

These and other objects and advantages will become apparent hereinafter.

Briefly, the invention embodies a resilient sealing member having an inner marginal surface and diaphragm means defining with said inner marginal surface passage means through said sealing member. The invention also embodies a check valve assembly comprising relatively movable sealing means for controlling the displacement and return flow of pressure fluid through a master cylinder outlet, one of said sealing means permitting displacement flow and preventing return flow through the other of said sealing means, and said sealing means being relatively movable to permit said return flow.

Figure 2:
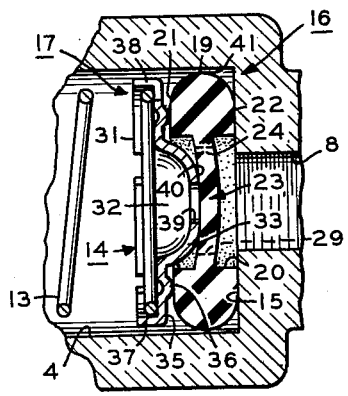
Figure 3:
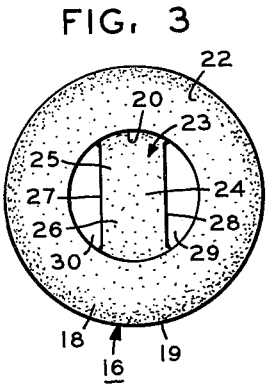
Figure 4:
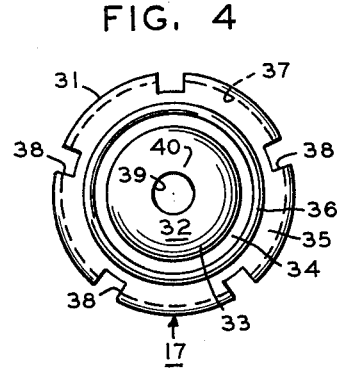
Figure 6:
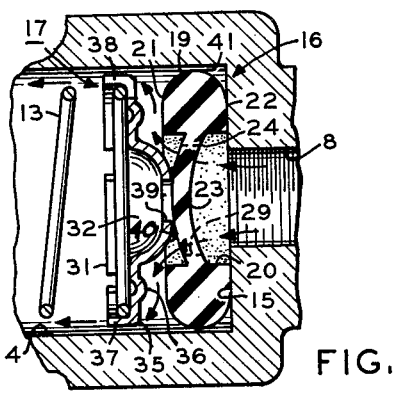
Figure 5:
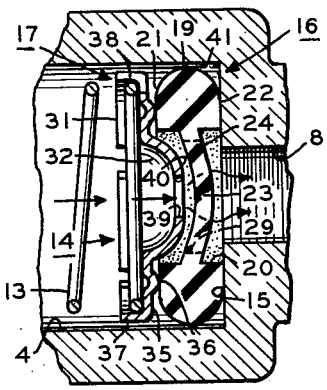
Figure 7:
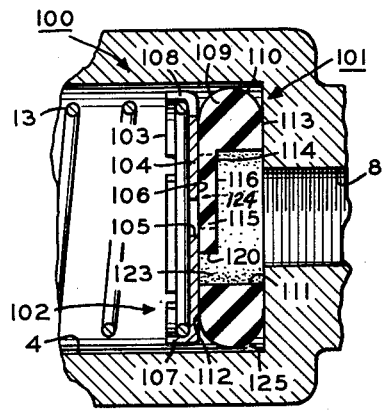
Figure 8:
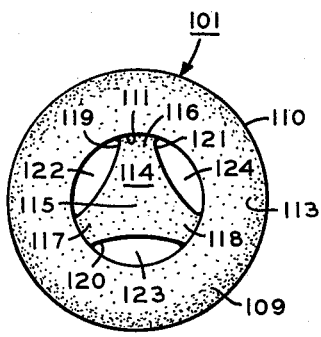

The invention also consists in the parts and arrangement of parts hereinafter described and claimed. In the accompanying drawings which form a part of the specification and wherein like numerals refer to like parts wherever they occur:

FIG. 1 is a sectional view of a master cylinder showing an embodiment of the novel check valve assembly therein, FIG. 2 is a greatly enlarged fragmentary view of the check valve assembly shown in FIG. 1, FIGS. 3 and 4 are right-side elevational views showing, respectively, the sealing or resilient member and the valve or rigid member in FIG. 2 as separate elements prior to being assembled to constitute the check valve assembly, FIGS. 5 and 6 are fragmentary views of the check valve assembly shown in FIG. 2 illustrating, respectively, the operation of said check valve assembly during the protractile, pressure fluid displacement stroke and the retractile, pressure fluid return stroke of the master cylinder piston, FIG. 7 is a fragmentary view showing another embodiment of a check valve assembly in cross-section, and FIG. 8 is a right-side elevational view of the sealing or resilient element shown in FIG. 7.

Referring now to FIG. 1, a pressure generating device or master cylinder 1 is provided with a conventional housing 2 having an integrally formed, atmospheric, pressure fluid reservoir 3. A bore 4 is provided in the housing 2, and spaced supply and compensating ports 5 and 6 are positioned near the mid-portion of said bore to connect said bore and reservoir 3. The bore 4 is provided with a radially extending end wall 7 at the rightward end thereof, and an outlet port 8 has one end intersecting said end wall and the other end thereof is connected with a typical hydraulic brake system (not shown). A conventional master cylinder piston assembly 9 is provided with a head portion 10 with a plurality of axially drilled pressure fluid compensation passages 11 therethrough, and said head portion is slidably positioned in the bore 4 in abutting and driving engagement with the usual primary sealing cup 12. The piston assembly 9 and sealing cup 12 are normally maintained in a retracted position, as shown, by the compressive force of a return spring 13 having one end biased against said sealing cup. The other end of the return spring 13 normally biases a residual check valve assembly, indicated generally at 14, into sealing engagement with a valve seat 15 provided on the bore end wall 7 in circumscribing relation with the outlet port 8.

The check valve assembly 14 is provided with a sealing or resilient member 16 and a valve or rigid member 17 which are shown individually prior to assembly in the master cylinder 1 in FIGS. 3 and 4. The sealing member 16 is provided with an annular body 18 having spaced marginal surfaces 19 and 20 which respectively define the outer and inner extremities of said body. The body portion 18 is also provided with opposed side surfaces 21 and 22 which interconnect with the outer and inner marginal surfaces 19 and 20, respectively, and define the axial extremities of said body portion 18. An integrally formed diaphragm or flap element 23 is provided with a centrally located valve or sealing portion 24 having opposed integral connecting arms 25 and 26 extending therefrom and connecting with diametrally opposed portions on the inner marginal surface 20. The connecting arms 25 and 26 are provided with opposed side edges 27 and 28, which define with the inner marginal surface 20, open flow passages 29 and 30 through the body 18 and interconnecting with the opposed side surfaces 21 and 22.

A valve or rigid member 17 consists of a stamped metallic, annular body 31 having a centrally located portion 32 which is dished to provide a centrally located raised face 33. The central portion 32 is integrally formed with a radially extending portion 34 having an annular sealing surface 35 thereon, and an annular rib 36 is provided on said sealing surface. A plurality of axially extending, annular spring retaining and guide flanges 37 are integrally formed with the radially extending portion 34 at the outer periphery thereof, and a plurality of passages 38 are provided through the radially extending portion 34 and between the flanges 37 to facilitate substantially unrestricted pressure fluid flow past the rigid member 17. Another passage or port 39 is centrally provided in the central portion 32 connecting across the rigid member 16 and intersecting with raised face 33, and a valve seat 40 is provided on the raised face 33 in circumscribing relation with the port 38.

In the assembly of the check valve device 14, the resilient member 16 is inserted into the master cylinder 1 so that the side surface 22 thereof is sealably engaged with the seat 15 on the bore end wall 7, and in this manner, the flow passages 29 and 30 are positioned in open pressure fluid flow communication with the outlet port 8. It should be noted that the diameter of the sealing member 16 is slightly less than that of the bore 4 to provide a relatively restricted flow passage 41 between the outer marginal surface 19 of said sealing member and said bore. It is convenient to snap the retaining and guide flanges 37 of the rigid member 17 onto the end of the return spring 13 for insertion into the master cylinder bore 4 to assemble said rigid member with the resilient member 16; however, it is apparent that said rigid member could be assembled with said resilient member independently of said return spring. Upon complete assembly of the check valve 14 and the master cylinder 1, as shown in FIGS. 1 and 2, the compressive force of the return spring 13 urges the annular rib 36 on sealing surface 35 of the rigid member 17 into sealable engagement with the side surface 21 of the resilient member 16, and the valve seat 40 on the face 33 of the rigid member is also biased into sealable engagement with the central sealing portion 24 of the resilient member diaphragm 23 thereby normally closing the egress port 39 in said rigid member. Of course, the compressive force of the return spring 13 acting on the rigid member 17 also normally serves to bias the side surface 22 of the resilient member 16 into sealable engagement with the end wall seat 15 about the outlet port 8.

In the operation, an operator applied force moves the piston assembly 9 and sealing cup 12 rightwardly in the bore 4 in its protractile or pressure generating stroke to displace pressure fluid from said bore through the port 39 in the rigid member 17. The velocity and pressure of this displacement flow acts on the resilient member diaphragm 23 to disengage the central sealing portion 24 thereof from sealable engagement with the valve seat 40 on the rigid member face 33 so that said displacement flow can pass through the open passages 29 and 30 in the resilient member 16 and therefrom through the outlet port 8. The arrows in FIG. 5 indicate the path of the displacement flow of pressure fluid during the protractile stroke of the master cylinder piston assembly 9 and sealing cup 12. The fluid pressure so generated by the displacement flow of pressure fluid serves to energize the brake system (not shown).

When the operator applied force is removed, the pressure differential between the brake system energizing fluid pressure acting on one side of the master cylinder piston assembly 9 and sealing cup 12 and the atmospheric pressure acting on the other side thereof through said atmospheric reservoir 3 and supply port 5 serves to move said piston assembly and sealing cup in its retractile stroke toward its retracted position. In this manner, the pressure differential so created will cause the pressure fluid previously displaced from the master cylinder bore 4 into the brake system to flow back into said master cylinder bore thereby effecting return flow. The return flow acts on the resilient member diaphragm 23 to sealably re-engage the sealing portion 24 thereof with the valve seat 40 on the rigid member face 33 closing the egress port 39 and preventing the return flow of pressure fluid therethrough. With the port 39 closed, the aforementioned pressure differential acts across the effective areas of the rigid member 17 effecting leftward movement thereof against the compressive force of the return spring 13. In this manner, the annular sealing rib 36 is disengaged from the resilient member side surface or seat 21 to create an alternate path for the return flow of pressure fluid from the brake system through the outlet port 8, the resilient member passages 29 and 30, between the disengaged surfaces 21 and 35 of the resilient and rigid members 16 and 17, respectively, and therefrom through the rigid member passages 38 and between the rigid member flanges 37 and the bore 4. The arrows in FIG. 6 indicate the path of the return flow of pressure fluid during the retractile stroke of the master cylinder piston assembly 9 and sealing cup 12. In some instances when the retractile stroke of the piston assembly 9 and sealing cup 12 is extremely fast, a negligible seepage of pressure fluid might occur between the resilient member side surface 22 and the end wall seat 15; however, the displacement and return flow of pressure fluid through the passages 29 and 30 does not appreciably affect the position of the sealing member 15 which substantially remains in its original position in the bore 4.

Referring now to FIGS. 7 and 8, a check valve assembly 100 is shown in the bore 4 of the master cylinder 1 having substantially the same component parts and functioning in the same manner as the previously described check valve assembly 14 with the following exceptions. The check valve assembly is provided with a sealing or resilient member 101 and a valve or rigid member 102. The rigid member 102 consists of a stamped, metallic body 103 having a radially extending portion 104 with a centrally located port 105 extending therethrough, and a valve seat 106 is provided on said radial portion 104 in circumscribing relation with the port 105. A plurality of annular axially extending spring retaining and guide flanges 107 are integrally formed with the radial portion 104 at the outer periphery thereof, and a plurality of passages 108 are provided through the central portion 104 at the outer periphery thereof between the flanges 107.

The sealing member 101 is provided with an annular body 109 having spaced marginal surfaces 110 and 111 defining the outer and inner extremities of said body, and said spaced marginal surfaces are interconnected by opposed side surfaces 112 and 113 defining the axial extremities of said body. A diaphragm 114 is provided with a centrally located valve or sealing portion 115 having connecting arms 116, 117, 118 extending therefrom and connecting with the inner marginal surface 111. The connecting arms 116, 117, 118 are provided with side edges 119, 120, 121, which define with the inner marginl surface 111, open flow passages 122, 123, 124 through the body 109 and interconnecting with the opposed side surfaces 112 and 113.

In the assembly of the check valve device 100, the resilient member 101 is inserted into the master cylinder bore 4 so that the side surface 113 is sealably engaged with the end wall seat 15, and in this manner the flow passages 122, 123, 124 are positioned in open pressure fluid communication with the outlet port 8. It should be noted that the diameter of the resilient member 101 is slightly less than that of the bore 4 creating a restricted flow passage or clearance 125 therebetween. The flanges 107 of the rigid member 102 are snapped onto the end of the return spring 13 so that upon completion of the assembly of the master cylinder 1 and check valve device, said return spring normally biases the radial portion 104 of said rigid member into sealing engagement with the side surface 112 of the resilient member 101 and the valve seat 106 into sealable engagement with the sealing portion 115 of the diaphragm 114 to close the rigid member port 105.

It is now apparent that a novel sealing member and check valve assembly meeting the objects set out hereinbefore are provided and that changes or modifications to the precise configurations, shapes, or details of the construction set forth in the disclosure by way of illustration may be made by those skilled in the art without departing from the spirit of the invention as defined by the claims which follow.

What I claim is:

1. In a housing having a valve seat between an outlet and an interior portion of said housing, means for controlling pressure fluid flow between said housing interior portion and outlet comprising a resilient annular member sealably engaged with said valve seat, a rigid member having an annular sealing surface adjacent to the peripheral edge thereof and normally sealably engaged with said annular member, diaphragm means integral with said annular member, passage means between said diaphragm means and annular member in open pressure fluid communication with said outlet, aperture means in said rigid member through which the flow passes, another sealing surface on said rigid member about said aperture means for engagement with said diaphragm means, said diaphragm means being disengaged from said other sealing surface in response to the flow to provide passage through said aperture means in one direction and being engaged with said other sealing surface in response to the flow to prevent passage through said aperture means in the opposite direction, and said rigid member having an effective area between said sealing surfaces and being movable in response to the flow acting on said effective area to disengage said first named sealing surface from said annular body and provide passage therebetween in the opposite direction.

2. In a housing having a valve seat between an outlet and an interior portion of said housing, means for controlling pressure fluid flow between said housing interior portion and outlet comprising a pair of relatively movable members, each of said members having a pair of radially spaced and opposed sealing surfaces thereon, resilient means normally urging said members in a direction to engage the respective sealing surfaces thereof and to engage one of said members with said housing valve seat, aperture means extending through one of the sealing surfaces on the other of said members to provide passage of the flow in one direction, one of said sealing surfaces on said one member being normally in sealable engagement with said one sealing surface on said other member to prevent passage of the flow through said aperture means in an opposite direction and movable in response to the flow to disengage said one sealing surface on said other member to permit passage through said aperture means in the one direction, and an effective area on said other member between the sealing surfaces thereof, said other member being movable in response to the flow acting on said effective area to disengage the other of said sealing surfaces thereon from the other of said sealing surfaces on said one member to provide passage therebetween of the flow in the opposite direction.

3. In a housing having a valve seat between an outlet and an interior portion of said housing, means for controlling pressure fluid flow between said housing interior portion and outlet comprising a rigid member and a resilient member each having opposed peripheral sealing portions, means normally urging said rigid and resilient members into sealable engagement at said peripheral sealing portions and normally urging said resilient member into sealable engagement with said valve seat, diaphragm means on said resilient member and defining therewith passage means in open pressure fluid communication with said outlet, aperture means in said rigid member to provide passage of flow therethrough in one direction, another sealing portion on said rigid member about said aperture means, said diaphragm means being normally in sealable engagement with said other sealing portion to prevent passage of the flow through said aperture means in an opposite direction and being movable in response to the flow in the one direction to disengage said other sealing portion and permit passage of the flow through said aperture means in the one direction, and a flow responsive area on said rigid member between said peripheral and other sealing surfaces thereon, said rigid member being movable in response to the flow acting on said flow responsive area to disengage said peripheral sealing portion thereon from said peripheral sealing portion on said resilient member and provide passage therebetween of the flow in the opposite direction.

4. In a housing having a valve seat between an outlet and an interior portion of said housing, double-acting valve means for controlling pressure fluid flow between said housing interior portion and outlet comprising a resilient annular member having opposed radially extending sealing surfaces thereon, one of said sealing surfaces being positioned in sealing engagement with said valve seat, a marginal surface on said annular member defining the inner extremity thereof, diaphragm means integral with said annular member, at least one free edge surface on said diaphragm means and defining with said inner marginal surface passage means through said annular member, said passage means being in open flow communication with said outlet, a rigid member having a pair of radially spaced seats thereon, spring means normally biasing said rigid member in a direction to sealably engage one of said seats with the other of said sealing surfaces on said annular member, an aperture in said rigid member extending through the other of said seats, said diaphragm means normally being sealably engaged with said other seat to close said aperture and prevent passage of the flow therethrough in one direction and said diaphragm means being movable in response to the flow to disengage said other seat and open said aperture to provide passage of the flow therethrough in an opposite direction, and said rigid member having an effective area between said seats responsive to the flow to move said rigid member and disengage said one seat from said other sealing surface of said annular member and provide passage therebetween for the flow in the one direction.

5. In a housing having a valve seat between an outlet and an interior portion of said housing, double-acting valve means for controlling pressure fluid flow between said housing interior portion and outlet comprising a resilient annular member engaged with said valve seat, an annular sealing surface on said resilient member adjacent the periphery thereof, a marginal surface on said annular member defining the inner extremity thereof, diaphragm means including a centrally located sealing portion, a plurality of connecting arms extending from said sealing portion and connected with said marginal surface, opposed free edges on said connecting arms defining with said marginal surface a plurality of passage means through said annular member, said plurality of passage means being in open pressure fluid flow communication with said outlet, a rigid disc member having an annular seat adjacent the periphery thereof, spring means engaged with said rigid member and normally biasing said annular seat into sealing engagement with said sealing surface on said annular member, an aperture in said rigid member through which the flow passes in one direction, another seat on said rigid member about said aperture, said diaphragm means sealing portion normally being sealably engaged with said other seat to close said aperture and prevent passage of the flow therethrough in an opposite direction and said diaphragm means sealing portion being deflected out of engagement with said other seat in response to the flow to provide passage of the flow through said aperture in the one direction, and a flow responsive area between said first named and other seats on said rigid member, said rigid member being movable against said spring means in response to the flow acting on said flow responsive area to disengage said first named seat from said sealing surface on said annular member and provide passage therebetween for the flow in the opposite direction.

6. In a housing having a valve seat between an outlet and an interior portion of said housing, double-acting valve means for controlling pressure fluid flow between said housing interior portion and outlet comprising a resilient member having an annular body, a pair of radially spaced marginal surfaces on said body defining the inner and outer circumferential extremities thereof, opposed radially extending side surfaces interconnecting said inner and outer marginal surfaces and defining the axial extremities of said body, one of said side surfaces being positioned in sealing engagement with said housing valve seat, diaphragm means including a centrally located sealing portion, connecting arms integral with said sealing portion and connected with diametrally opposed portions of said inner marginal surface between said side surfaces, opposed side edges on said connecting arms defining with said inner marginal surface a plurality of passage means through said body, said passage means being in open pressure fluid flow communication with said outlet, a rigid disc member having a flat peripheral portion and a raised center portion, an aperture in said raised center portion through which the flow passes in one direction, a first sealing surface on said flat peripheral portion and a second sealing surface on said raised center portion in circumscribing relation with said aperture, said first and second sealing surfaces facing toward said outlet, spring means engaged with said rigid member and normally urging said first sealing surface into sealing engagement with the other of said side surfaces on said resilient member body to prevent passage of the flow therebetween in the one direction, said spring means also normally urging said second sealing surface into sealing engagement with said diaphragm means sealing portion to close said aperture and prevent passage of flow therethrough in an opposite direction, said diaphragm means sealing portion being movable out of sealing engagement with said second sealing surface in response to the flow to permit passage through said aperture in the one direction, and an annular flow responsive area on said rigid member between said first and second sealing surfaces, said rigid member being movable against said spring means in response to the flow acting on said flow responsive area to disengage said first sealing surface from said other side surface of said resilient member body to provide passage therebetween of said flow in the opposite direction.

References Cited in the file of this patent

UNITED STATES PATENTS

| | | |
|---|---|---|
| 2,355,862 | Harper | Aug. 15, 1944 |
| 2,528,796 | Smith | Nov. 7, 1950 |
| 2,722,370 | Owsen et al. | Nov. 1, 1955 |